UNITED STATES PATENT OFFICE.

ORRIN A. WHEELER, OF CHICAGO, ILLINOIS, ASSIGNOR OF ONE-THIRD TO EDWARD D. LOEWENTHAL AND ONE-THIRD TO B. LOEWENTHAL, BOTH OF CHICAGO, ILLINOIS.

RECLAIMING RUBBER.

1,135,236. Specification of Letters Patent. Patented Apr. 13, 1915.

No Drawing. Application filed October 30, 1912. Serial No. 728,633.

*To all whom it may concern:*

Be it known that I, ORRIN A. WHEELER, a resident of Chicago, in the county of Cook and State of Illinois, have invented certain new and useful Improvements in Reclaiming Rubber, of which the following is a full, clear, and exact description.

The invention relates to the art of reclaiming rubber scrap containing cotton fiber.

The object of the invention is to recover and utilize the fiber contained in the waste vulcanized rubber, such as shoes, vehicle-tires, hose, etc., by treating the scrap so that the cellulose of the fiber may be left in the reclaimed product and utilized instead of being removed therefrom.

Through experiments, I have discovered that the cotton fiber in vulcanized rubber scrap can be converted into a tenacious cellulose which is insoluble in water and structureless, previous to or during the time of, devulcanization of the scrap without separation of the rubber from the fiber; and that when tenacious cellulose and the devulcanized rubber are combined and sulfur in various proportions is added, the resultant product will have qualities superior, for many purposes, to new rubber or new rubber products, because the tenacious, elastic cellulose renders the product durable, stable, lessens its weight as compared with new rubber, and lessens the cost of production of reclaimed materials. Hard rubber made from reclaimed scrap containing fiber will endure a much higher degree of heat than ordinary rubber and will better resist the action of oils, acids, alkalis than ordinary hard rubber and can be manufactured at a materially less cost than hard rubber made in the usual way, because all of the waste fiber is utilized to improve the material.

The improved method of treating rubber scrap, containing fiber is as follows: The scrap, such as tires, shoes, hose, etc., is ground and pulverized in the usual manner. The pulverized material is then treated with a strong solution (about 20%) of caustic soda and allowed to stand in a cool place approximately from three to five hours. Next the material is placed in a digester which is equipped so that it can be sealed or closed up tightly and carbon disulfid ($CS_2$), about one pound more or less according to the character of the material treated to about ten pounds of dry rubber scrap is added to material, and then the digester is closed and hermetically sealed. This mixture is permitted to remain in the digester from one to five hours, to permit chemical reaction to occur, the digester being operated during such a period to stir and agitate the mass to facilitate said reaction and thereby bring about a combination of the soda and sulfur with the cellulose and so producing a cellulose xanthogenate. On completion of this reaction, the rubber and fiber is converted into a sticky cohesive mass. Next, water in quantity approximately equal to the original dry rubber is added to the material in the digester and the agitation is continued, the water mixing with the cellulose to distend it. Next the mass in the digester is heated by carefully raising the steam-pressure in the heating-chamber around the digester, to approximately one hundred pounds, which pressure is kept up for a period ranging approximately from 15 to 20 hours, according to the stock under treatment and during such time, agitation and stirring of the mass will be continued part of or all of the time. This heating causes the cellulose to become insoluble in water and devulcanizes the rubber in the presence of caustic soda and carbon disulfid. In this process, carbon disulfid tends to dissolve the combined sulfur and dissolves all the free sulfur, and when heated, produces a high pressure in the digester thereby causing thorough impregnation of every particle of rubber under treatment and greatly assisting in the recovery of the rubber. The solvent may, of course, be recovered.

In this method of reclaiming rubber, the cotton fiber, that is usually destroyed or removed in other processes, is permitted to remain with the rubber and utilized, and becomes a valuable ingredient in both soft and hard rubber compounds. The rubber and elastic tenacious cellulose unite and intermingle so that an article made therefrom will possess the toughness and wearing qualities of new and pure rubber and will be superior for some purposes, particularly where the article made from the reclaimed product is to be subjected to heat, is exposed to the elements, or to the action of oils, acids and alkalis. Since the cellulose of the fibrous material in the scrap is utilized to advantage in the product, the cost is less than under any previous process in which the fiber is destroyed and removed or removed without being destroyed.

An excellent grade of material can be made from the product of the process with the addition of sulfur, and with the addition of some of the cheaper gums such as pontianiac, acra flake, guayule, an article of a higher grade can be produced at a low cost. If desired, new rubber may be added.

A comparatively good grade of reclaimed rubber can be obtained by introducing the alkali and carbon disulfid at the same time but better results are believed to result from the successive treatment with the alkali and carbon disulfid, as hereinbefore set forth.

The invention is not to be understood as restricted to the precise process and proportions set forth since these may be modified by those skilled in the art without departing from the spirit and scope of the invention.

Having thus described the invention, what I claim as new and desire to secure by Letters Patent, is:

1. That improvement in reclaiming vulcanized rubber scrap containing cellulose, which consists in subjecting it to the action of an alkali solution and carbon disulfid.

2. That improvement in reclaiming vulcanized rubber scrap containing cellulose, which consists in first treating the scrap with an alkali solution and then with carbon disulfid in a closed receptacle.

3. That improvement in reclaiming vulcanized rubber scrap containing cellulose, which consists in first treating the scrap with an alkali solution, then with carbon disulfid in a closed receptacle, then adding water to the mass, and then heating the same.

4. That improvement in reclaiming vulcanized rubber scrap containing cellulose, which consists, in pulverizing the scrap, treating it with a solution of alkali at normal temperature for approximately an hour or more, then adding carbon disulfid, then permitting chemical reaction to occur, and then heating the mass.

5. That improvement in reclaiming vulcanized rubber scrap containing cellulose, which consists in treating pulverized scrap with an alkali solution and carbon disulfid in the presence of heat.

6. That improvement in reclaiming vulcanized rubber scrap containing cellulose, which consists in first treating the scrap with an alkali solution for a period, then treating it with carbon disulfid for a sufficient period to permit chemical reaction to occur to convert the rubber and fiber into a cohesive mass and thereafter subjecting the mass to heat.

7. That improvement in reclaiming rubber scrap containing cellulose fiber which consists in treating such scrap with a sulfur compound and a suitable compound of an alakli metal until the cellulose is converted into a cellulose xanthogenate.

8. That improvement in reclaiming rubber scrap containing cellulose fiber which consists in treating said scrap with a compound of sulfur and a suitable compound of an alkali metal to convert the cellulose into a cellulose xanthogenate and devulcanizing the rubber by means of the said compound of sulfur and compound of an alkali metal and heat.

9. The process of reclaiming rubber which consists in subjecting a mixture of vulcanized rubber and cellulose fiber, to treatment with a sulfur compound and an alkali under heat and pressure.

10. The process of reclaiming rubber which consists in subjecting vulcanized rubber containing cellulose fiber to treatment with carbon disulfid and caustic soda until devulcanization of the rubber is effected, and a cellulose xanthogenate produced.

11. The process of reclaiming rubber which consists in treating the raw material with a solution of caustic alkali, allowing the mass so treated to stand, then placing it in a digester, adding carbon disulfid, and stirring, then adding water and stirring, and then subjecting the mass to heat.

12. The process of reclaiming rubber which consists in treating pulverized scrap rubber with a strong solution of caustic soda, allowing the material so treated to stand for from three to five hours, placing it in a digester, adding carbon disulfid, agitating for from one to five hours, adding water in quantity equal to the rubber present, and subjecting to heat whereby the cellulose present in the scrap is converted into an insoluble and flexible compound of sulfur and cellulose intimately intermingled with devulcanized rubber.

ORRIN A. WHEELER.

Witnesses:
  FRED GERLACH,
  MILDRED A. STUMPF.